March 31, 1925.

S. G. LEONARD 1,531,669

ELECTRICAL PROTECTIVE DEVICE

Filed Nov. 30, 1920

WITNESSES:
H. J. Shelhamer
J. E. Foster

INVENTOR
Stuart G. Leonard
BY
Wesley G. Carr
ATTORNEY

Patented Mar. 31, 1925.

1,531,669

UNITED STATES PATENT OFFICE.

STUART G. LEONARD, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL PROTECTIVE DEVICE.

Application filed November 30, 1920. Serial No. 427,293.

*To all whom it may concern:*

Be it known that I, STUART G. LEONARD, a citizen of the United States, and a resident of Wilkinsburg, in the county of Allegheny and State of Pennsylvania, have invented a new and useful Improvement in Electrical Protective Devices, of which the following is a specification.

My invention relates to electric protective devices and particularly to devices for protecting polyphase translating apparatus.

One object of my invention is to disconnect a polyphase translating apparatus from a supply circuit to which it is connected when an open phase occurs in that circuit.

Another object of my invention is to provide a device that shall prevent the operation of a polyphase translating device when the current traversing the conductors of the device become unbalanced beyond a predetermined degree.

Another object of my invention is to provide a device, of the above indicated character, that shall be simple and economical in construction and reliable and effective in its operation.

The relay embodying my invention comprises means respectively energized from two phases of a three-phase circuit and counterbalancing means energized from the third phase.

The counterbalancing means is arranged to have a torque under balanced conditions that is equal to the sum of the torques developed by the first-mentioned means. When the relay is unbalanced to a predetermined degree, a movable member effects the completion of an external control circuit to trip an interrupter.

Figure 1:
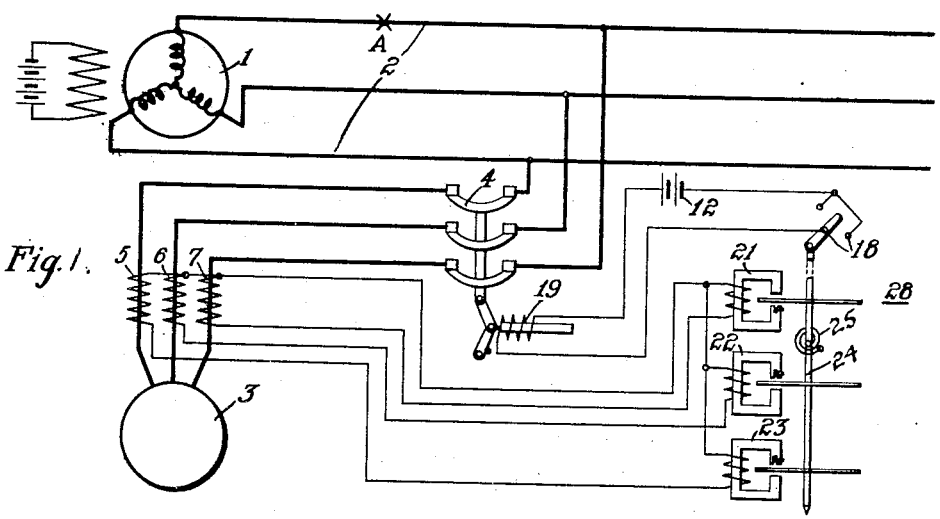
Figure 2:
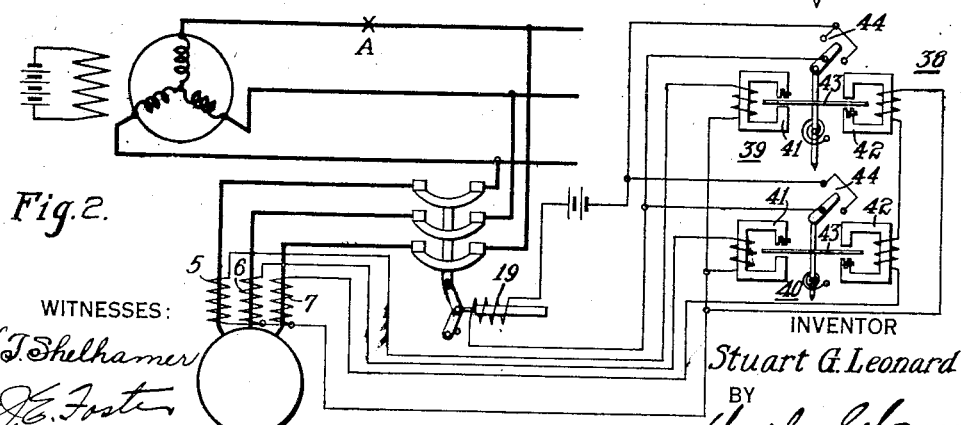

In the accompanying drawings, Figs. 1, and 2 are diagrammatic views of electrical circuits containing devices of modified forms embodying my invention.

Referring to Fig. 1, a source 1 of polyphase electromotive force supplies energy to a circuit 2 from which energy may be supplied to a motor 3 through a circuit interrupter 4. A plurality of current transformers 5, 6 and 7, that are connected in the circuit conductors to the motor, serve to energize a relay 28 to control the same in accordance with the condition of the circuit between the source 1 of electromotive force and the motor 3.

The relay 28 comprises three induction meter elements 21, 22 and 23, respectively, controlling three disc-armature members mounted upon a common shaft 24. The movable member of the relay is normally balanced, the torque developed by the restraining element 21 being double that of either of the actuating elements 22 or 23 and opposing the said elements. A spring 25 attached to the movable element of the relay normally positions the same in the central position shown.

So long as the currents that are induced in the current transformers 5, 6 and 7 and, consequently, that traverse the elements 21, 22 and 23 are equal, the relay 28 remains in a balanced position. When one phase of the circuit becomes open circuited, as at the point A, only the current transformers 5 and 6 and, consequently, elements 22 and 23 remain energized. The relay 28 is thereupon unbalanced and consequent engagement of the contact members 18 energizes the tripping magnet 19 of the interrupter 4 from the battery 12 to open the circuit.

Referring to Fig. 2, the relay 38 illustrated therein comprises two induction relay elements 39 and 40. Each element comprises two magnetizable core members 41 and 42 and a disc member 43. The disc members, when actuated, control the engagement of parallel-connected sets of contact members 44. The core members 41 are respectively energized from one phase of the circuit and the two members 42 are both energized from the third phase of the circuit. The members 41 and 42 are arranged to produce opposing torques in the disc members 43. Upon the open circuiting of one phase of the circuit, engagement is effected by the corresponding set of contact members 44 to energize the tripping magnet 19 of the interrupter to open the same.

I do not limit my invention to the specific arrangements that are illustrated since various modifications may be made therein without departing from the spirit and scope of the invention, as set forth in the appended claims.

I claim as my invention:

1. In a three-phase circuit, the combination with a relay comprising two movable disc members and actuating means therefor, of means for severally energizing the actuating means in accordance with the current traversing two phases of the circuit, counter-actuating means for restraining the disc members, and means for energizing the counter-actuating means in accordance with the current traversing the third phase.

2. In a three-phase circuit, the combination with a relay comprising two induction disc-armature members and actuating and restraining means for each armature member, of means for energizing said actuating means in accordance with the current traversing two phases of the circuit, and means for energizing said restraining means for each armature member in accordance with the current traversing a different phase than that connected to the actuating means of the same armature member.

3. In a polyphase circuit, the combination of a plurality of induction disc-armature elements, actuating and restraining means for each of said elements, means for energizing said actuating means for each element from a separate phase of said circuit, and means for energizing said restraining means for each element from a different phase than that connected to the actuating means of the same element.

In testimony whereof, I have hereunto subscribed my name this 22nd day of November 1920.

STUART G. LEONARD.